(12) United States Patent
Meyer

(10) Patent No.: US 8,146,536 B1
(45) Date of Patent: Apr. 3, 2012

(54) WASTE TRANSFER PAN FOR PET LITTER AND METHOD OF USE

(76) Inventor: Neil Arthur Meyer, Toyohashi (JP)

( * ) Notice: Subject to any disclaimer, the term of this patent is extended or adjusted under 35 U.S.C. 154(b) by 566 days.

(21) Appl. No.: 12/228,007

(22) Filed: Aug. 7, 2008

(51) Int. Cl.
*A01K 29/00* (2006.01)

(52) U.S. Cl. .................... 119/166; 119/161; 119/165

(58) Field of Classification Search .......... 119/161–163, 119/165, 166, 867; 294/1.3–1.5; D30/162; 15/257.1–257.9
See application file for complete search history.

(56) References Cited

U.S. PATENT DOCUMENTS

| | | | | |
|---|---|---|---|---|
| 2,849,743 A | * | 9/1958 | McFarland | 15/257.2 |
| 3,606,436 A | * | 9/1971 | Lynch | 294/1.4 |
| 4,926,794 A | * | 5/1990 | Yamamoto | 119/165 |
| 5,039,149 A | * | 8/1991 | Gish | 294/1.4 |
| 5,134,974 A | * | 8/1992 | Houser | 119/168 |
| 5,580,111 A | * | 12/1996 | Bohn | 294/1.3 |
| 5,636,594 A | * | 6/1997 | Pina | 119/165 |
| 5,782,203 A | * | 7/1998 | Tennen | 119/166 |
| 5,855,186 A | * | 1/1999 | Larsen et al. | 119/166 |
| 6,234,549 B1 | * | 5/2001 | Brownell | 294/1.3 |
| 6,247,735 B1 | * | 6/2001 | Berkman | 294/1.3 |
| 6,478,351 B1 | * | 11/2002 | Nelson | 294/1.4 |
| 7,313,844 B2 | * | 1/2008 | Petner et al. | 15/257.2 |
| 7,487,743 B1 | * | 2/2009 | Lane | 119/166 |
| 7,673,585 B1 | * | 3/2010 | Emmi et al. | 119/168 |
| 2003/0168017 A1 | * | 9/2003 | Perelli et al. | 119/165 |
| 2005/0263089 A1 | * | 12/2005 | Hirokawa et al. | 119/165 |
| 2008/0164704 A1 | * | 7/2008 | Boskett et al. | 294/1.4 |
| 2009/0199778 A1 | * | 8/2009 | Kratzer et al. | 119/165 |

FOREIGN PATENT DOCUMENTS

| | | | | |
|---|---|---|---|---|
| JP | 2002115222 A | * | 4/2002 | |
| JP | 2008161367 A | * | 7/2008 | |

* cited by examiner

*Primary Examiner* — Kimberly Berona
*Assistant Examiner* — Danielle Clerkley
(74) *Attorney, Agent, or Firm* — Albert W Davis, Jr.

(57) ABSTRACT

A waste collection and transfer pan device is disclosed. The device includes a handle portion connected to a non-planar body portion having a planar end portion forming a cavity therebetween. The pan device is useful for collecting and transferring waste material. The planar pan end portion allows storage of the pan device in an upright orientation.

6 Claims, 5 Drawing Sheets

WASTE TRANSFER PAN FOR PET LITTER AND METHOD OF USE

BACKGROUND OF THE INVENTION

1. Field of the Invention

The present invention relates to a dust pan or waste transfer pan. More particularly, the invention relates to a pan for collecting and transferring particulate material or the like. Most particularly, the invention relates to such a pan that is readily washed clean and capable of storage in close proximity to a waste container or pet litter box.

2. Background Information

Although dust pans and similar waste collection devices are well known and widely used in the modern home, very few such devices are suitable for collecting and transferring soiled pet litter with storage in close proximity to a waste container or pet litter box. Furthermore, the area around a pet litter box often accumulates varying amounts of pet litter carried from the litter box by the animal. Additionally, the recent popularity of biodegradable, flushable litters has created a need to transport pet waste from the litter box to a toilet for disposal. A perforated scoop is routinely employed to remove soiled litter from the litter box, but the scoop is designed to allow unsoiled litter to pass through the scoop, retaining only the soiled clumps of litter. The perforated scoop is unsuitable for collecting litter particles that are tracked out of the litter box by the pet. Conventional dust pans are stored by hanging on a wall which requires installing a nail or other pan receiving device. A dust pan may be leaned on its edge against the side of the litter box or waste container where it can be easily knocked over and where it occupies floor space. Thus, there is an unmet need for a transfer pan that can be used for collecting pet waste from the litter box for transport to a disposal area, that can also be used for collecting litter scattered on the floor near the exterior of the litter box, that can be used to collect soiled litter from the interior of the litter box, that can be readily cleaned and that can be stored in close proximity to the litter box.

Applicant has devised a waste collection and transfer pan that stores in close proximity to a container, such as a pet litter box or a waste container.

Yamamoto U.S. Pat. No. 4,517,920 and U.S. Pat. No. 4,926,794 and Tennen U.S. Pat. No. 5,782,203 show pet litter pan or box with litter scoop storage within the litter box or receptacle.

SUMMARY OF THE INVENTION

The invention is directed to a waste collection and transfer pan device, comprising a generally rectangular, nonplanar pan body portion having at least a first edge opposed to a second edge. A linear pan handle portion extends from the pan portion's first opposed edge and is coplanar therewith. A planar pan end portion is connected perpendicularly to the pan portion's second opposed edge, and also perpendicular to the linear pan handle portion. The pan end portion and pan body portion form a cavity there between adapted for collecting and transferring waste material. The planar pan end portion allows storage of the device in an upright orientation in close proximity to a container.

DETAILED DESCRIPTION OF THE EMBODIMENTS

Nomenclature

| | |
|---|---|
| 10 | Waste Collection and Transfer Pan Member |
| 20 | Nonplanar Pan Body Portion |
| 22 | First Edge of Pan Portion |
| 24 | Planar Second Edge of Pan Portion |
| 24a | First End of Planar Second Edge |
| 24b | Second End of Planar Second Edge |
| 26 | Opposed Edge of Pan Portion |
| 28 | Opposed Edge of Pan Portion |
| 30 | Body Section of Pan Portion |
| 32 | Body Section of Pan Portion |
| 33 | Angled Intersection of Body Sections |
| 35 | Linear Pan Handle Portion |
| 40 | Planar Pan End Portion |
| 42 | Angled Intersection of Pan End Portion and Body Sections |
| 45 | Cavity Between Body Portion and End Portion |
| 50 | Front Edge of Planar Pan End Portion |
| 100 | Waste Collection and Transfer Pan Member |
| 120 | Nonplanar Pan Body Portion |
| 122 | First Edge of Pan Portion |
| 124 | Planar Second Edge of Pan Portion |
| 124a | First End of Planar Second Edge |
| 124b | Second End of Planar Second Edge |
| 126 | Opposed Edge of Pan Portion |
| 128 | Opposed Edge of Pan Portion |
| 135 | Linear Pan Handle Portion |
| 140 | Planar Pan End Portion |
| 142 | Angled Intersection of Pan End Portion and Body Portion |
| 145 | Cavity Between Body Portion and End Portion |
| 150 | Front Edge of Planar Pan End Portion |
| S | Support Surface |
| LB | Litter Box |
| WC | Waste Container |

DESCRIPTION

Figure 1:
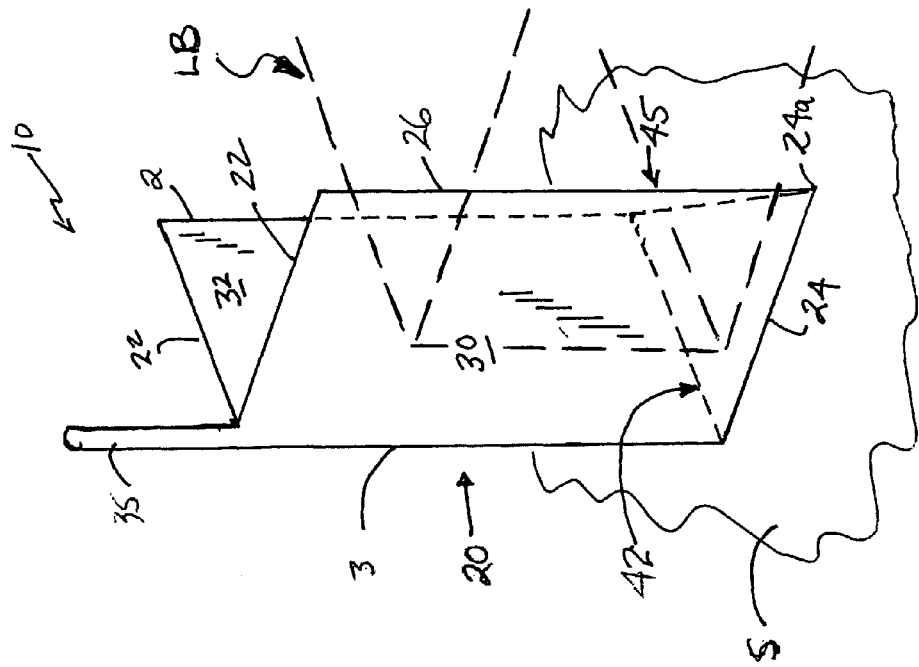
FIG. 1 is a front perspective view of one embodiment of the waste collection and transfer pan member of the present invention.
Figure 2:
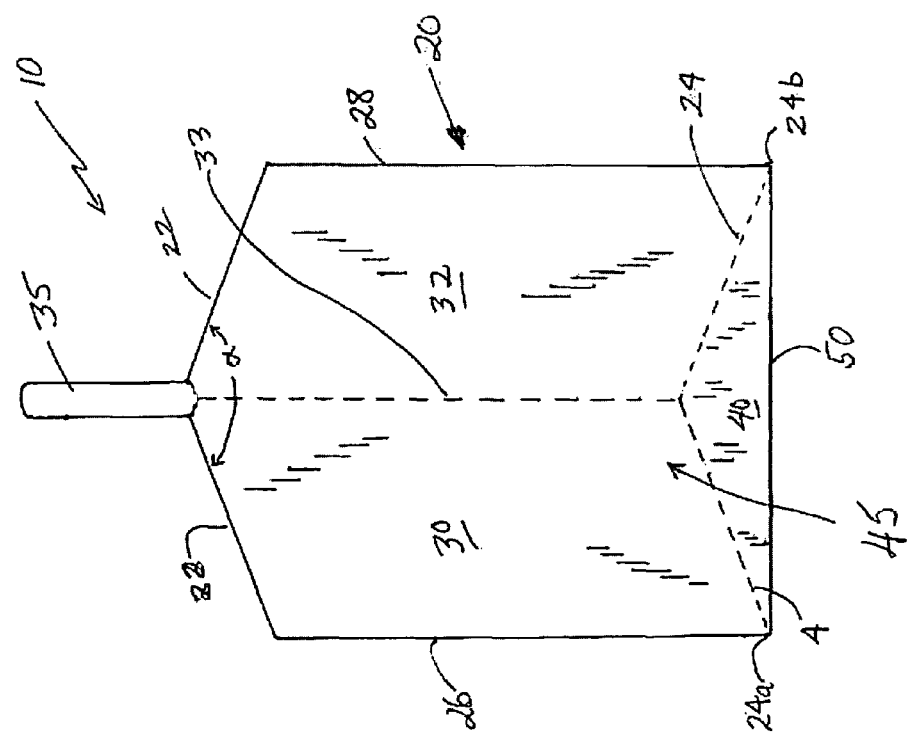
FIG. 2 is a side perspective view of the one embodiment of the waste collection and transfer pan member of the present invention.

Referring to FIGS. 1 and 2, one embodiment of the waste collection and transfer pan member 10 is illustrated. The pan member 10 includes a generally rectangular, nonplanar pan body portion 20, having at least a first edge 22 and a planar second edge 24 opposed to each other. In this embodiment, the pan body portion 20 has two other edges 26, 28, also opposed to each other. The pan member 10 is configured such that the body portion 20 includes two intersecting body sections 30, 32 oriented with an angle, V, of at least about 90 degrees and less than 180 degrees there between, as illustrated in FIGS. 1 and 2. The intersecting body sections 30, 32 produce and angled intersection 33 there between.

A linear pan handle portion 35 extends from the pan body portion's first opposed edge 22 and is coplanar with the pan body portion 20. Preferably, the pan handle portion 35 is centered on the pan body portion's first opposed edge 22 at an end of the angled intersection 33 of the two body sections 30, 32.

A planar pan end portion 40 is connected perpendicular to the pan portion's second planar edge 24 and also perpendicular to the linear pan handle portion 35. In this embodiment, the front edge 50 of the pan end portion 40 terminates at a line connecting the first end 24a and the second end 24b of the pan body portion's planar second edge 24. The pan end portion 40 and pan body portion 20 form a cavity 45 there between. The cavity 45 is adapted for collecting and transferring of waste material. Grasping the handle portion 35, the user sets the pan end portion 40 on a flat surface and sweeps waste material over the front edge 50 of the end portion 40 into the cavity 45 of the pan member 10. The planar pan end portion 40 allows for storage of the pan member 10 in an upright orientation, with the planar pan end portion 40 resting on a support surface S, as illustrated in FIG. 2. In addition, the planar pan end portion 40 allows the pan member 10 to be stored in close proximity to a rectangular container, such as a pet litter box LB (shown in dotted lines in FIG. 2). Sliding the planar pan end portion 40 under one corner of the litter box LB, with the body sections 30, 32 adjacent the vertical walls of the litter box, allows unobtrusive storage of the pan member 10 in close proximity to the point of use. In addition, other utensils, such as a sweeper/broom or perforated scoop, may be stored by attachment to the pan member 10.

In a preferred embodiment of the invention, the pan member 10 is of unitary construction and fabricated from an impervious material, such as plastic or metal. Most preferably, the interior, angled intersection 33 of the two body sections 30, 32, as well as the angled intersection 42 of the two body sections 30, 32 and the planar end portion 40, are rounded to prevent accumulation of dust/dirt/waste material collected within the pan member's cavity 45. The rounded intersections 33, 42 or interior corners, allow for facile cleaning of the pan member 10.

Figure 4:
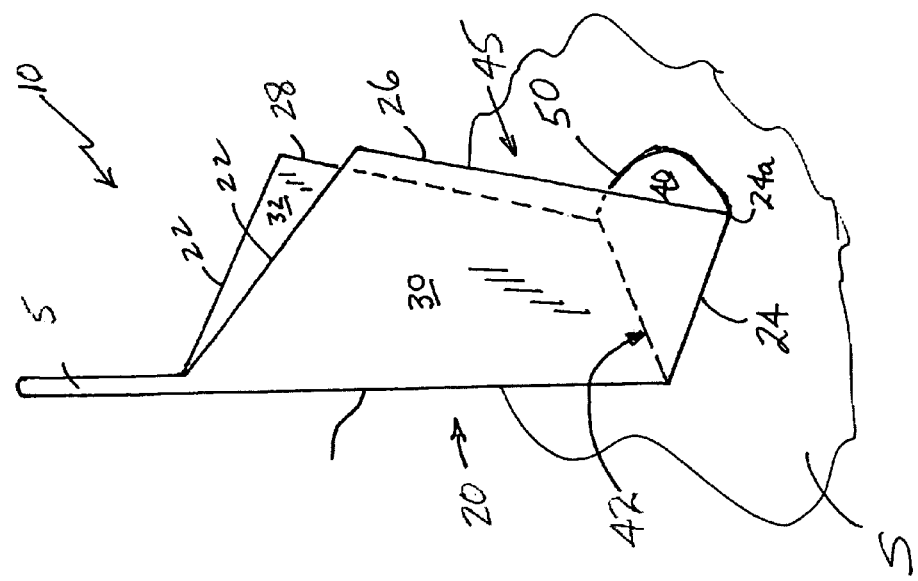
FIG. 4 is a side perspective view of the another embodiment of the waste collection and transfer pan member of the present invention.
Figure 3:
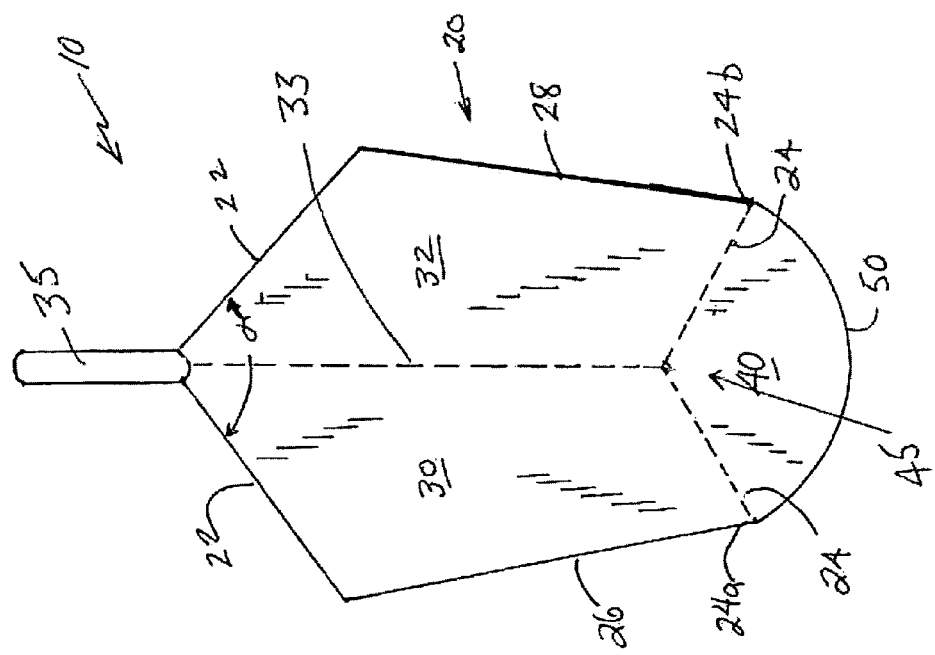
FIG. 3 is a front perspective view of another embodiment of the waste collection and transfer pan member of the present invention.

Referring now to FIGS. 3 and 4, an alternative embodiment of the waste collection and transfer pan member 10 is illustrated. In this embodiment, the pan member 10 again is configured such that the body portion 20 includes two intersecting body sections 30, 32 oriented with an angle, ∀, of at least about 90 degrees and less than 180 degrees there between. The intersecting body sections 30, 32 produce and angled intersection 33 there between.

A linear panhandle portion 35 extends from the pan body portion's first opposed edge 22 and is coplanar with the pan body portion 20. Preferably, the panhandle portion 35 is centered on the pan body portion's first opposed edge 22, at an end of the angled intersection 33 of the two body sections 30, 32.

The planar pan end portion 40 is connected to the pan body portion's second planar edge 24, perpendicular thereto and perpendicular to the linear pan handle portion 35. In this embodiment, the front edge 50 of the pan end portion 40 extends beyond a line connecting the first end 24a and the second end 24b of the pan body portion's planar second edge 24. The pan end portion 40 and pan body portion 20 form a cavity 45 there between. The cavity 45 is adapted for collecting and transferring waste material, as described above.

Figure 6:
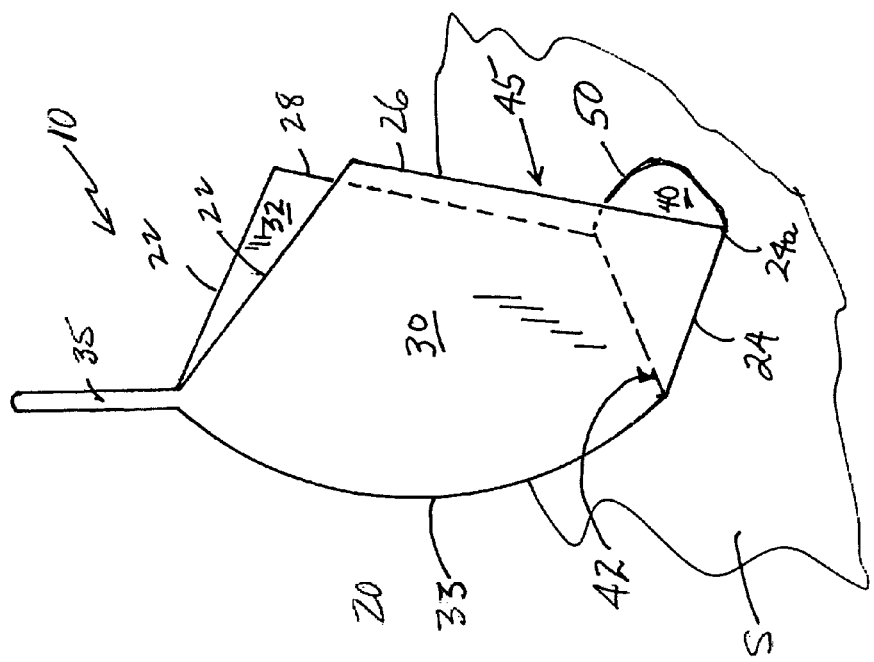
FIG. 6 is a side perspective view of the yet another embodiment of the waste collection and transfer pan member of the present invention.
Figure 5:
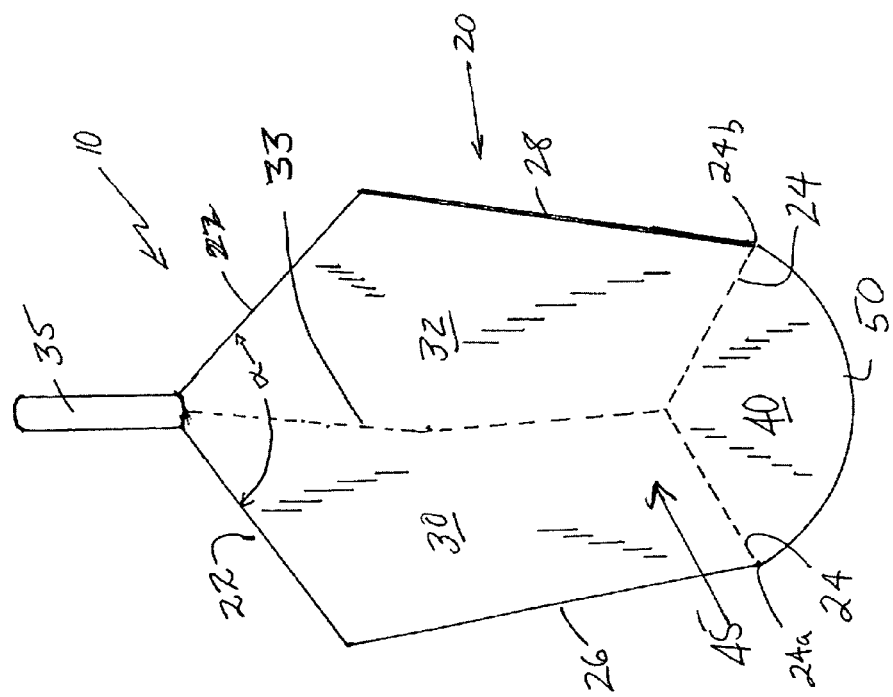
FIG. 5 is a front perspective view of yet another embodiment of the waste collection and transfer pan member of the present invention.

Likewise, the planar pan end portion 40 allows for storage of the pan member 10 in an upright orientation with the planar pan end portion 40 resting on a support surface S, as illustrated in FIG. 4. In addition, the planar pan end portion 40 allows the pan member 10 to be stored in close proximity to a rectangular container, such as a pet litter box. Sliding the planar pan end portion 40 under one corner of the litter box, with the body sections 30, 32 adjacent the vertical walls of the litter box, allows unobtrusive storage of the pan member 10 in close proximity to the point of use. Referring now to FIGS. 5 and 6, another alternative embodiment of the waste collection and transfer pan member 10 is illustrated. In this embodiment, the pan member 10 again is configured such that the body portion 20 includes two intersecting body sections 30, 32 oriented with an angle, ∀, of at least about 90 degrees and less than 180 degrees there between. The intersecting body sections 30, 32 produce and angled intersection 33 there between. A similar linear handle portion 35 is present. The planar pan end portion 40 is connected perpendicularly to the pan portion's second planar edge 24 and also perpendicular to the linear pan handle portion 35. In this embodiment, the front edge 50 of the pan end portion 40 extends beyond a line connecting the first end 24a and the second end 24b of the pan body portion's planar second edge 24.

The pan end portion 40 and pan body portion 20 form a cavity 45 there between. The cavity 45 is adapted for collecting and transferring waste material. In this embodiment, the angled intersection 33 of the two body sections 30, 32 curves away from a vertical line between the pan handle portion 35 and the pan end portion 40.

Likewise, the planar pan end portion 40 allows for storage of the pan member 10 in an upright orientation with the planar pan end portion 40 resting on a support surface S, as illustrated in FIG. 6. In addition, the planar pan end portion 40 allows the pan member 10 to be stored in close proximity to a rectangular container, such as a pet litter box. Sliding the planar pan end portion 40 under one corner of the litter box, with the body sections 30, 32 adjacent the vertical walls of the litter box, allows unobtrusive storage of the pan member 10 in close proximity to the point of use.

Figure 8:
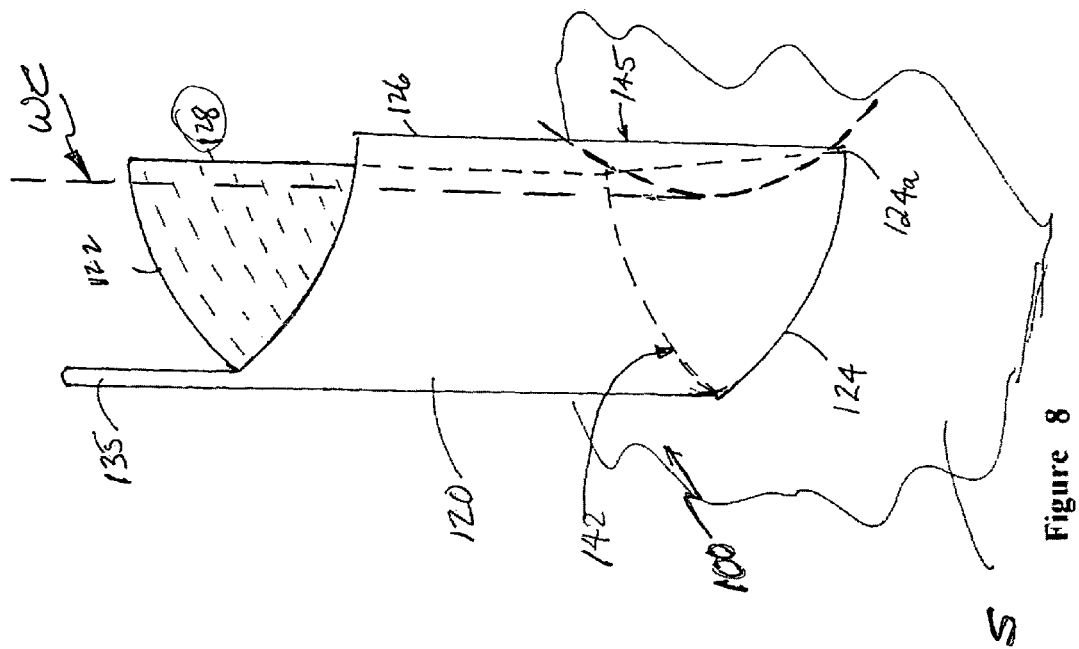
FIG. 8 is a side perspective view of the alternative embodiment of the waste collection and transfer pan member of the present invention.
Figure 7:
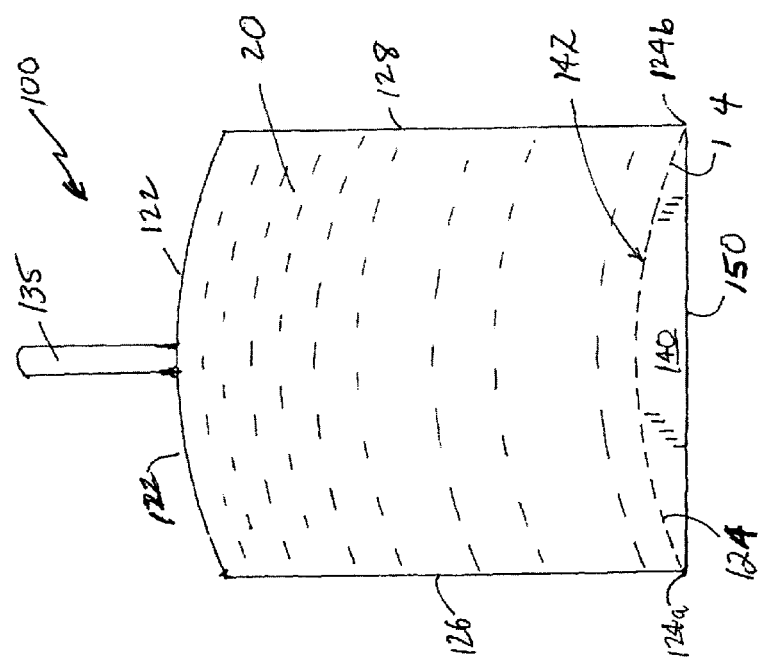
FIG. 7 is a front perspective view of an alternative embodiment of the waste collection and transfer pan member of the present invention.

Referring to FIGS. 7 and 8, another embodiment of the waste collection and transfer pan member 100 is illustrated. The pan member 100 again includes a generally rectangular, nonplanar pan body portion 120, having at least a first edge 122 and a second, planar edge 124 opposed to each other. In this embodiment, the pan body portion 120 has two other edges 126, 128, which are also opposed to each other. The pan member 100 is configured such that the body portion 120 is a smooth, cylindrical surface, as illustrated in FIGS. 7 and 8, with a C-shaped planar second edge 124 having a first end 124a and a second end 124b. A linear pan handle portion 135 extends from the pan body portion's first opposed edge 122 and is coplanar with the pan body portion 120. Preferably, the pan handle portion 135 is centered on the pan body portion's first opposed edge 122.

A planar pan end portion 140 is connected perpendicularly to the pan portion's second planar edge 124 and also perpendicular to the linear pan handle portion 135. In this embodiment, the front edge 150 of the pan end portion 140 terminates at a line connecting the first end 124a and the second end 124b of the pan body portion's planar second edge 124. The pan end portion 140 and pan body portion 120 form a cavity 145 there between. The cavity 145 is adapted for collecting and transferring of waste material. Grasping the handle portion 135, the user sets the pan end portion 140 on a flat surface and sweeps waste material over the front edge 150 of the end portion 140 into the cavity 145 of the pan member 100. The planar pan end portion 140 allows for storage of the pan member 100 in an upright orientation with the planar pan end portion 140 resting on a support surface S, as illustrated in FIG. 8. In addition, the planar pan end portion 140 allows the pan member 100 to be stored in close proximity to a cylindrical container, such as a garbage can or similar round container. Sliding the planar pan end portion 140 under one edge of the cylindrical or other shape waste container WC (shown in dotted lines in FIG. 8), with the body section 120 adjacent the vertical wall of the container, allows unobtrusive storage of the pan member 100 in close proximity to the point of use. In addition, other utensils, such as a sweeper/broom or perforated scoop, may be stored by attachment to the pan member 100.

In a preferred embodiment of the invention, the pan member 100 is of unitary construction and fabricated from an impervious material, such as plastic or metal. Most preferably, the interior, angled intersection 142 of the pan body portion 120 and the planar end portion 140 is rounded to prevent accumulation of dust/dirt/waste material collected within the pan member's cavity 145. The rounded intersection or interior corner allows for facile cleaning of the pan member 100.

Figure 10:
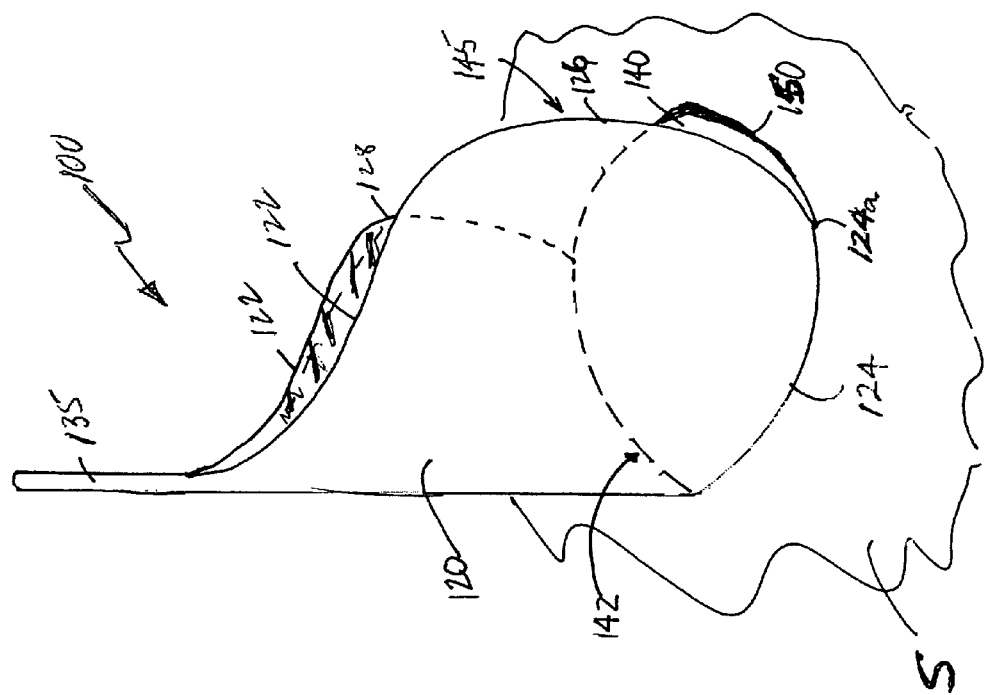
FIG. 10 is a side perspective view of the another alternative embodiment of the waste collection and transfer pan member of the present invention.
Figure 9:
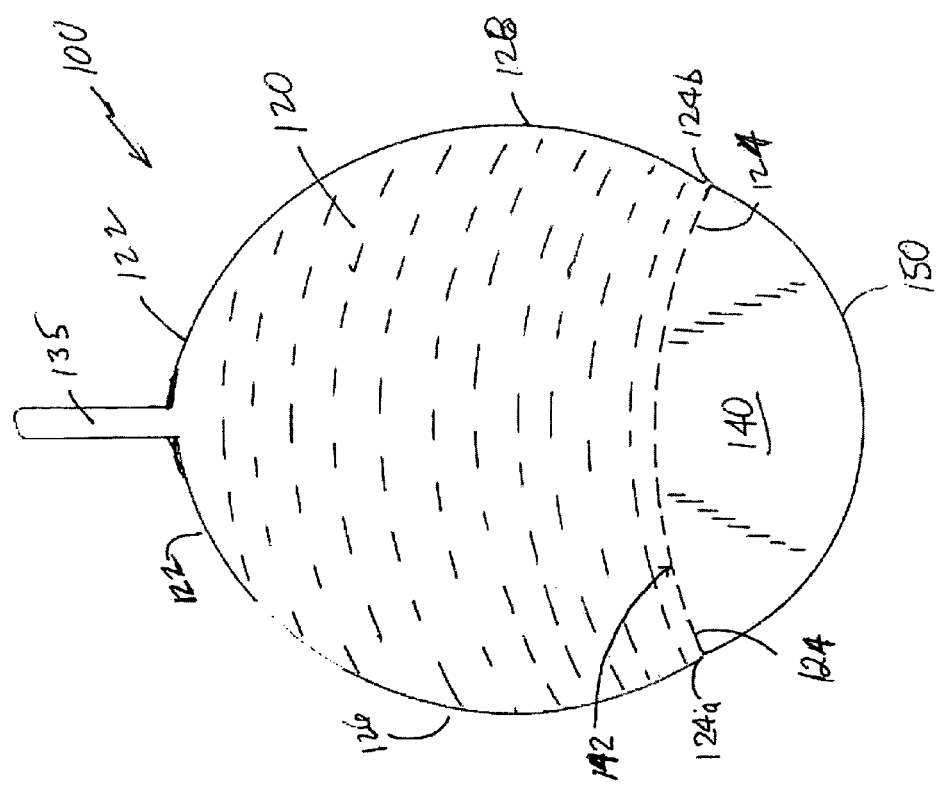
FIG. 9 is a front perspective view of another alternative embodiment of the waste collection and transfer pan member of the present invention.

Referring now to FIGS. 9 and 10, an alternative embodiment of the waste collection and transfer pan member 100 is illustrated. In this embodiment, the pan member 100 again is configured such that the body portion 120 is a smooth, cylindrical surface, with a C-shaped planar second edge 124 having a first end 124a and a second end 124b. A linear pan handle portion 135 extends from the pan portion's first opposed edge 122 and is coplanar with the pan body portion 120. Preferably, the pan handle portion 135 is centered on the pan portion's first opposed edge 122.

A planar pan end portion 140 is connected perpendicularly to the pan body portion's second planar edge 124 and also perpendicular to the linear pan handle portion 135. In this embodiment, the front edge 150 of the pan end portion 140 extends beyond a line connecting the first end 124a and the second end 124b of the pan body portion's planar second edge 124. The pan end portion 140 and pan body portion 120 form a cavity 145 there between.

Again, the pan member 100 preferably is of unitary construction and fabricated from an impervious material, such as plastic or metal. Most preferably, the interior, angled intersection 142 of the pan body portion 120 and the planar end portion 140 is rounded to prevent accumulation of dust/dirt/waste material collected within the pan member's cavity 145. The rounded intersection or interior corner, allow for facile cleaning of the pan member 100.

In addition, the planar pan end portion 140 allows for storage of the pan member 100 in an upright orientation, with the planar pan end portion 140 resting on a support surface S, as illustrated in FIG. 10. In addition, the planar pan end portion 140 allows the pan member 100 to be stored in close proximity to a cylindrical container, such as a garbage can or similar round container. Sliding the planar pan end portion 140 under one edge of the cylindrical container, with the body section 120 adjacent the vertical wall of the container, allows unobtrusive storage of the pan member 100 in close proximity to the point of use. In addition, other utensils, such as a sweeper/broom or perforated scoop, may be stored by attachment to the pan member 100.

Methods of Use

When using the pan with a pet litter box, the shape of the cavity section 45, 145 enables the pan cavity to fit the corner of the litter box and the pan planar end portion to be slid under the bottom of the litter box. Alternatively, the pan planar end portion can be slid under the bottom of the litter box in a position other than in the corner of the litter box. Also, the pan can be stored next to the litter box without being slid under the litter box, that is the pan can stand on the planar end portion near but not under the box. If desired, a special litter box can be provided which has portions on the bottom (dimples, feet or spacers facing downward) to slightly raise the box from the floor or supporting surface to enable the planar end portion to be more easily slid under the litter box. The pan can support a brush or sweeper and/or a litter scoop. The support can be a loop of material, plastic or string that is attached to the brush or scoop and hangs from the handle portion 35, 135. Other ways of supporting the brush and/or the scoop can be used and can involve VELCRO, clips, hooks, etc. The brush or scoop do not need to be supported by the pan and can be stored any other location. The brush is picked up, and the pan moved to the area having debris, such as spilt litter, etc. The brush is then used to sweep the debris into the planar pan end portion 40, 140. The swept up debris can then be placed in a waste container or trash can by tilting the pan into the waste container. Also, the pan can be used with the scoop to remove waste from the litter box. The scoop is used to pick up the waste from the litter and transfer the waste to the pan 10. The pan can be held in a somewhat horizontal orientation with the non-planar pan body portion 20 having opposed edges 26, 28 facing upwards to receive or collect the waste. The collected up waste can then be placed in a waste container or trash can by tilting the pan into the waste container.

When using the pan with a waste container or trash can, the bottom planar surface of the pan can be stored under the corner or other portion of the waste container. Alternatively, the pan can stand near but not under any portion of the container or can. The pan can support a brush or sweeper. The support can be a loop of material, plastic or string that is attached to the brush and hangs from the handle portion 35, 135. Other ways of supporting the brush and/or the scoop can be used and can involve VELCRO, clips, hooks, etc. The brush or sweeper does not need to be supported by the pan and can be stored in any other location. The brush is picked up, and the pan moved to the area of having debris, spilt food, etc. The brush is then used to sweep the debris into the planar pan end portion 40, 140. The swept up debris can then be placed in a waste container or trash can by tilting the pan into the waste container.

While the invention has been particularly shown and described with reference to preferred embodiments thereof, it will be understood by those skilled in the art that various changes in form and details may be made therein without departing from the spirit and scope of the invention.

I claim:

1. A method of cleaning a pet litter box having litter and resting on a surface, comprising the following steps,
   providing a pan for receiving waste material, the pan having a planar end portion which rests on the surface and having a body portion and a handle, the body portion and handle extending in an upright direction from the end portion,
   placing the planar end portion on the surface and under the litter box for storage in an upright position, removing the planar end portion from under the litter box for cleaning the litter box, providing a litter scoop, scooping waste material from the litter box and transferring the waste material to the body portion of the pan with the pan off of the surface, taking the pan to a waste receptacle and depositing the waste material into the waste receptacle.

2. The method of claim 1 in which the body portion having only two vertical angled walls.

3. The method of claim 1 in which the body portion having a single vertical curved wall.

4. A method of cleaning a pet litter box having litter and resting on a surface, comprising the following steps, providing a pan for receiving waste material, the pan having a planar end portion which rests on the surface and having a body portion and a handle, the body portion and handle extending in an upright direction from the end portion, the body portion having an opening formed by two edges, the opening abutting the planar end portion, placing the planar end portion on the surface for storage in an upright position, removing the planar end portion from the surface for cleaning the litter box, providing a litter scoop, scooping waste material from the litter box and transferring the waste material to the body portion of the pan with the pan off of the surface through the opening in the body portion by holding the pan with the opening in an upward direction, taking the pan to a waste receptacle and depositing the waste material into the waste receptacle.

5. The method of claim 4 in which the body portion having only two vertical angled walls.

6. The method of claim 4 in which the body portion having a single vertical curved wall.

\* \* \* \* \*